US011968044B2

(12) United States Patent
Khoshnevisan et al.

(10) Patent No.: US 11,968,044 B2
(45) Date of Patent: Apr. 23, 2024

(54) INTERFERENCE MITIGATION BY PSEUDO-RANDOM MUTING FOR SOUNDING REFERENCE SIGNALS

(71) Applicant: QUALCOMM Incorporated, San Diego, CA (US)

(72) Inventors: Mostafa Khoshnevisan, San Diego, CA (US); Yitao Chen, San Diego, CA (US); Peter Gaal, San Diego, CA (US); Xiaoxia Zhang, San Diego, CA (US); Jing Sun, San Diego, CA (US)

(73) Assignee: QUALCOM Incorporated, San Diego, CA (US)

( * ) Notice: Subject to any disclaimer, the term of this patent is extended or adjusted under 35 U.S.C. 154(b) by 61 days.

(21) Appl. No.: 17/656,300

(22) Filed: Mar. 24, 2022

(65) Prior Publication Data

US 2023/0308215 A1  Sep. 28, 2023

(51) Int. Cl.
*H04L 1/16* (2023.01)
*H04L 1/1607* (2023.01)
*H04L 5/00* (2006.01)

(52) U.S. Cl.
CPC .......... *H04L 1/1642* (2013.01); *H04L 5/0051* (2013.01); *H04L 5/0053* (2013.01); *H04L 5/0082* (2013.01)

(58) Field of Classification Search
CPC ... H04L 5/0051; H04L 5/0048; H04L 5/0085; H04L 5/0082; H04L 5/0089; H04L 5/10053; H04L 5/10058; H04L 5/10055; H04L 5/10078
See application file for complete search history.

(56) References Cited

U.S. PATENT DOCUMENTS

| | | | | |
|---|---|---|---|---|
| 2014/0003262 | A1* | 1/2014 | He | H04W 36/22 370/252 |
| 2020/0028638 | A1* | 1/2020 | Liu | H04J 13/0062 |
| 2020/0350970 | A1* | 11/2020 | Liu | H04B 7/0628 |
| 2021/0336820 | A1* | 10/2021 | Lim | H04L 25/0224 |
| 2021/0384949 | A1* | 12/2021 | Kumar | H04W 76/15 |
| 2021/0409152 | A1* | 12/2021 | Zhang | H04L 1/0069 |
| 2022/0248329 | A1* | 8/2022 | Peng | H04W 52/0216 |
| 2023/0125714 | A1* | 4/2023 | Lee | H04W 72/541 370/277 |
| 2023/0188398 | A1* | 6/2023 | Alawieh | H04L 27/2613 375/262 |

FOREIGN PATENT DOCUMENTS

| | | | | |
|---|---|---|---|---|
| CN | 111132318 | A * | 5/2020 | .......... H04W 72/042 |
| CN | 116097115 | A * | 5/2023 | |
| WO | WO-2019029517 | A1 * | 2/2019 | ........... H04B 7/0408 |
| WO | WO-2020035948 | A1 * | 2/2020 | |

\* cited by examiner

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration of at least one sounding reference signal (SRS) resource, wherein the configuration indicates a pseudo-random sequence for muting an SRS associated with the at least one SRS resource. The UE may transmit the SRS using the at least one SRS resource based at least in part on the pseudo-random sequence. Numerous other aspects are described.

30 Claims, 11 Drawing Sheets

INTERFERENCE MITIGATION BY PSEUDO-RANDOM MUTING FOR SOUNDING REFERENCE SIGNALS

FIELD OF THE DISCLOSURE

Aspects of the present disclosure generally relate to wireless communication and to techniques and apparatuses for interference mitigation by pseudo-random muting for sounding reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of at least one sounding reference signal (SRS) resource, wherein the configuration indicates a pseudo-random sequence for muting an SRS associated with the at least one SRS resource. The method may include transmitting the SRS using the at least one SRS resource based at least in part on the pseudo-random sequence.

Some aspects described herein relate to a method of wireless communication performed by a network entity. The method may include transmitting, to a UE, a configuration of at least one SRS resource, wherein the configuration indicates a pseudo-random sequence for muting an SRS associated with the at least one SRS resource. The method may include receiving, from the UE, the SRS via the at least one SRS resource based at least in part on the pseudo-random sequence.

Some aspects described herein relate to an apparatus for wireless communication at a UE. The apparatus may include a memory and one or more processors coupled to the memory. The one or more processors may be configured to receive, from a network entity, a configuration of at least one SRS resource, wherein the configuration indicates a pseudo-random sequence for muting an SRS associated with the at least one SRS resource. The one or more processors may be configured to transmit the SRS using the at least one SRS resource based at least in part on the pseudo-random sequence.

Some aspects described herein relate to an apparatus for wireless communication at a network entity. The apparatus may include a memory and one or more processors coupled to the memory. The one or more processors may be configured to transmit, to a UE, a configuration of at least one SRS resource, wherein the configuration indicates a pseudo-random sequence for muting an SRS associated with the at least one SRS resource. The one or more processors may be configured to receive, from the UE, the SRS via the at least one SRS resource based at least in part on the pseudo-random sequence.

Some aspects described herein relate to a non-transitory computer-readable medium that stores a set of instructions for wireless communication by a UE. The set of instructions, when executed by one or more processors of the UE, may cause the UE to receive, from a network entity, a configuration of at least one SRS resource, wherein the configuration indicates a pseudo-random sequence for muting an SRS associated with the at least one SRS resource. The set of instructions, when executed by one or more processors of the UE, may cause the UE to transmit the SRS using the at least one SRS resource based at least in part on the pseudo-random sequence.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of at least one SRS resource, wherein the configuration indicates a pseudo-random sequence for muting an SRS associated with the at least one SRS resource. The set of instructions, when executed by one or more processors of the network entity, may cause the network entity to receive, from the UE, the SRS via the at least one SRS resource based at least in part on the pseudo-random sequence.

Some aspects described herein relate to an apparatus for wireless communication. The apparatus may include means for receiving, from a network entity, a configuration of at least one SRS resource, wherein the configuration indicates a pseudo-random sequence for muting an SRS associated with the at least one SRS resource. The apparatus may include means for transmitting the SRS using the at least one SRS resource based at least in part on the pseudo-random sequence.

Some aspects described herein relate to an apparatus for wireless communication. The apparatus may include means for transmitting, to a UE, a configuration of at least one SRS resource, wherein the configuration indicates a pseudo-random sequence for muting an SRS associated with the at least one SRS resource. The apparatus may include means for receiving, from the UE, the SRS via the at least one SRS resource based at least in part on the pseudo-random sequence.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
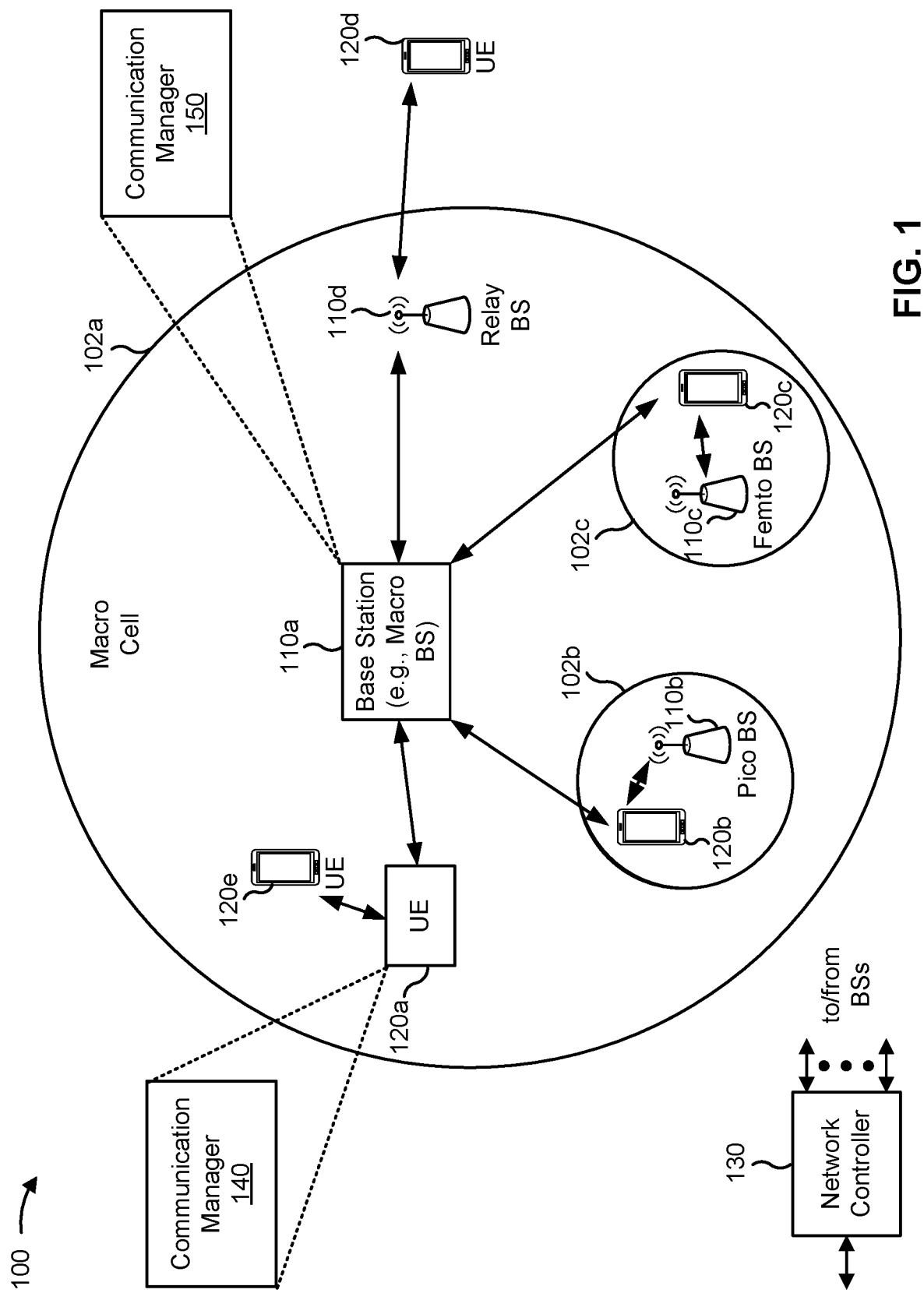
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (RAN) (O-RAN) architecture or the like, which will be described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of at least one sounding reference signal (SRS) resource, wherein the configuration indicates a pseudo-random sequence for muting an SRS associated with the at least one SRS resource; and transmit the SRS using the at least one SRS resource based at least in part on the pseudo-random sequence. Additionally, or alternatively, the communication manager 140 may perform one or more other operations described herein.

In some aspects, the network entity described elsewhere herein may correspond to the base station 110. In such aspects, the network entity may include a communication manager 150. As described in more detail elsewhere herein, the communication manager 150 may transmit, to a UE, a configuration of at least one SRS resource, wherein the configuration indicates a pseudo-random sequence for muting an SRS associated with the at least one SRS resource; and receive, from the UE, the SRS via the at least one SRS resource based at least in part on the pseudo-random sequence. Additionally, or alternatively, the communication manager 150 may perform one or more other operations described herein.

As indicated above, FIG. 1 is provided as an example. Other examples may differ from what is described with regard to FIG. 1.

Figure 2:
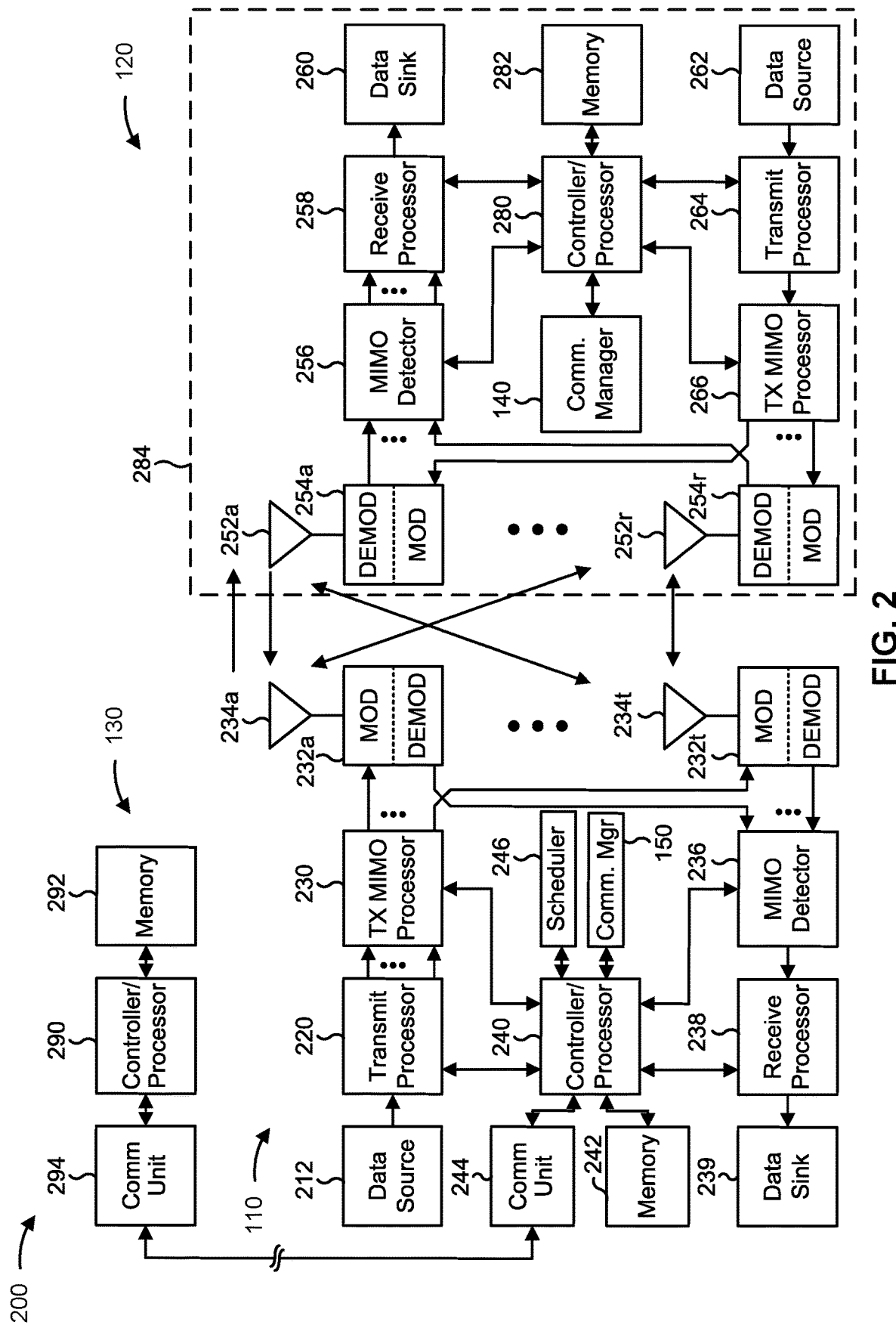
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with interference mitigation by pseudo-random muting for SRSs, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of at least one SRS resource, wherein the configuration indicates a pseudo-random sequence for muting an SRS associated with the at least one SRS resource; and/or means for transmitting the SRS using the at least one SRS resource based at least in part on the pseudo-random sequence. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting, to a UE, a configuration of at least one SRS resource, wherein the configuration indicates a pseudo-random sequence for muting an SRS associated with the at least one SRS resource; and/or means for receiving, from the UE, the SRS via the at least one SRS resource based at least in part on the pseudo-random sequence. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
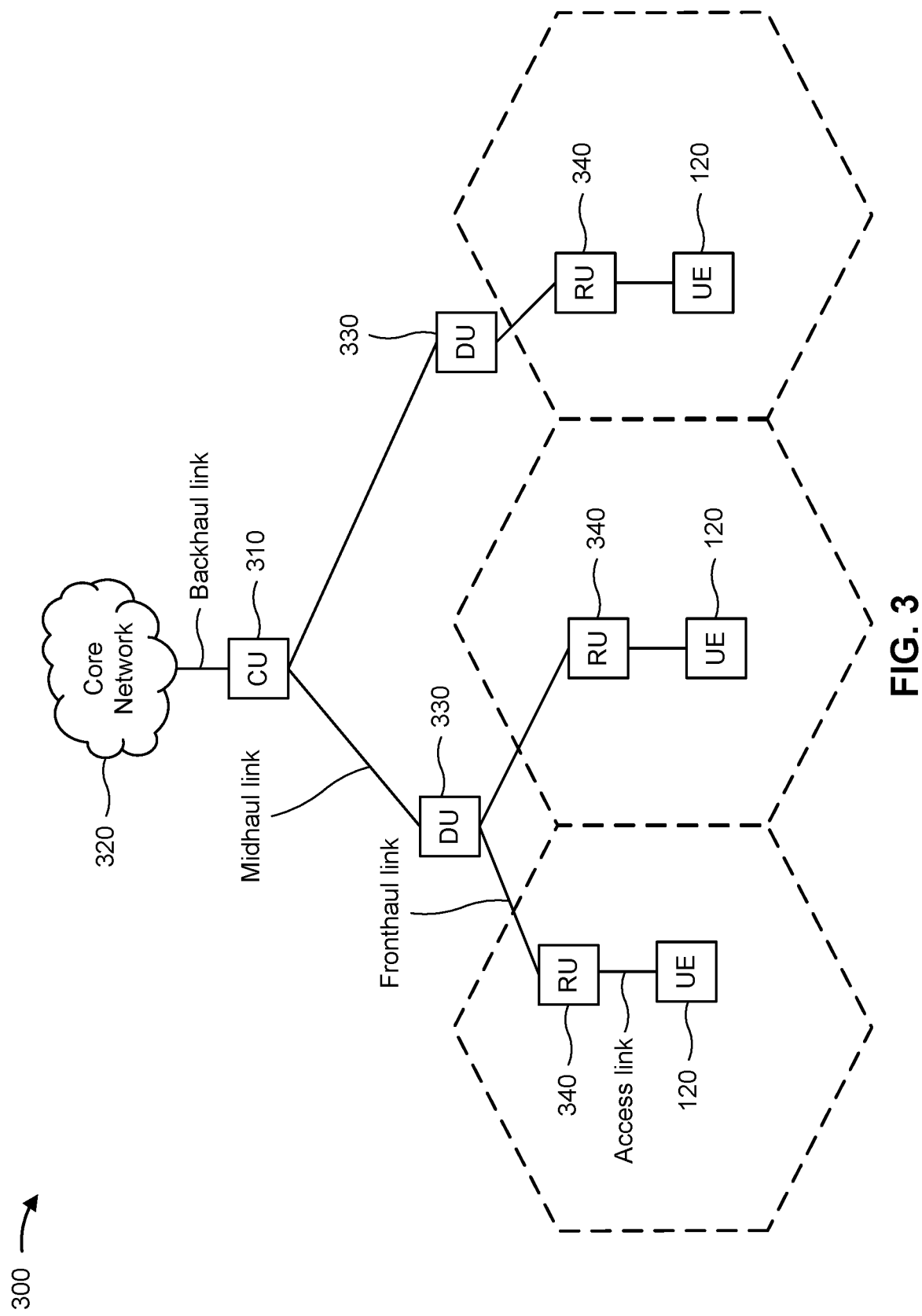
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
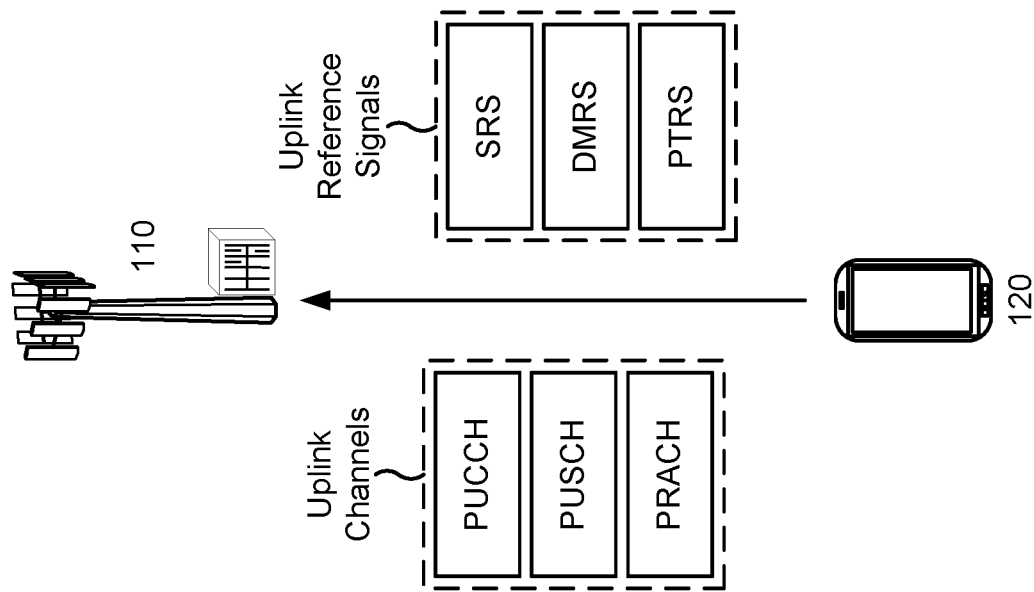
FIG. 4 is a diagram illustrating an example of physical channels and reference signals in a wireless network, in accordance with the present disclosure.
Figure 4:
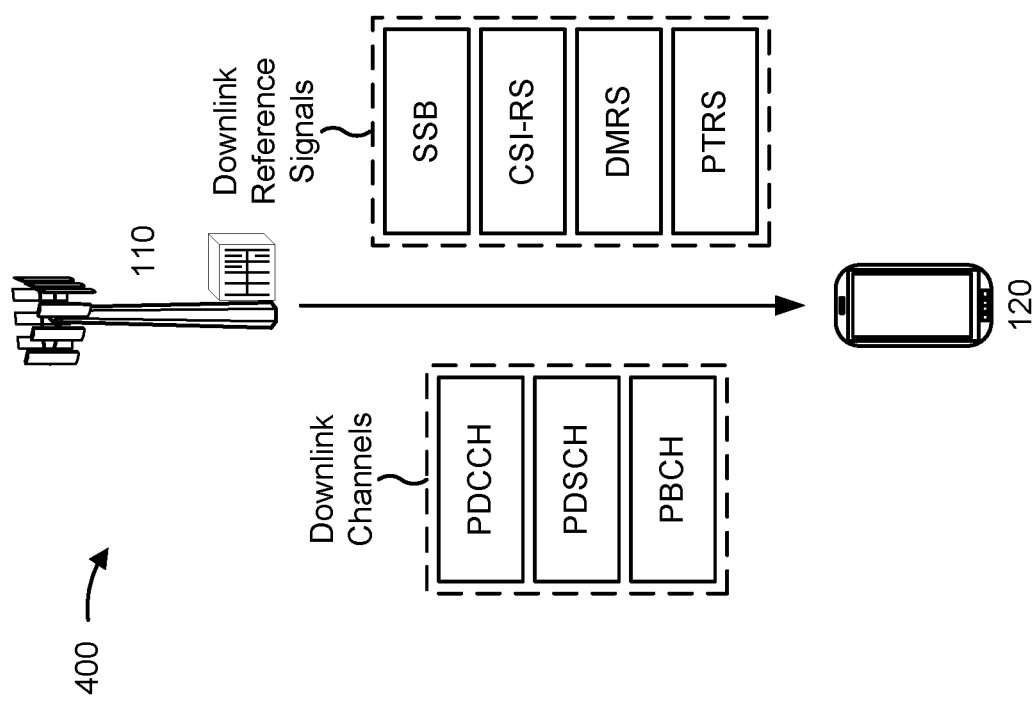

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include an SRS, a DMRS, or a PTRS, among other examples. Aspects of the SRS are described in more detail below in connection with FIGS. 5 and 6.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
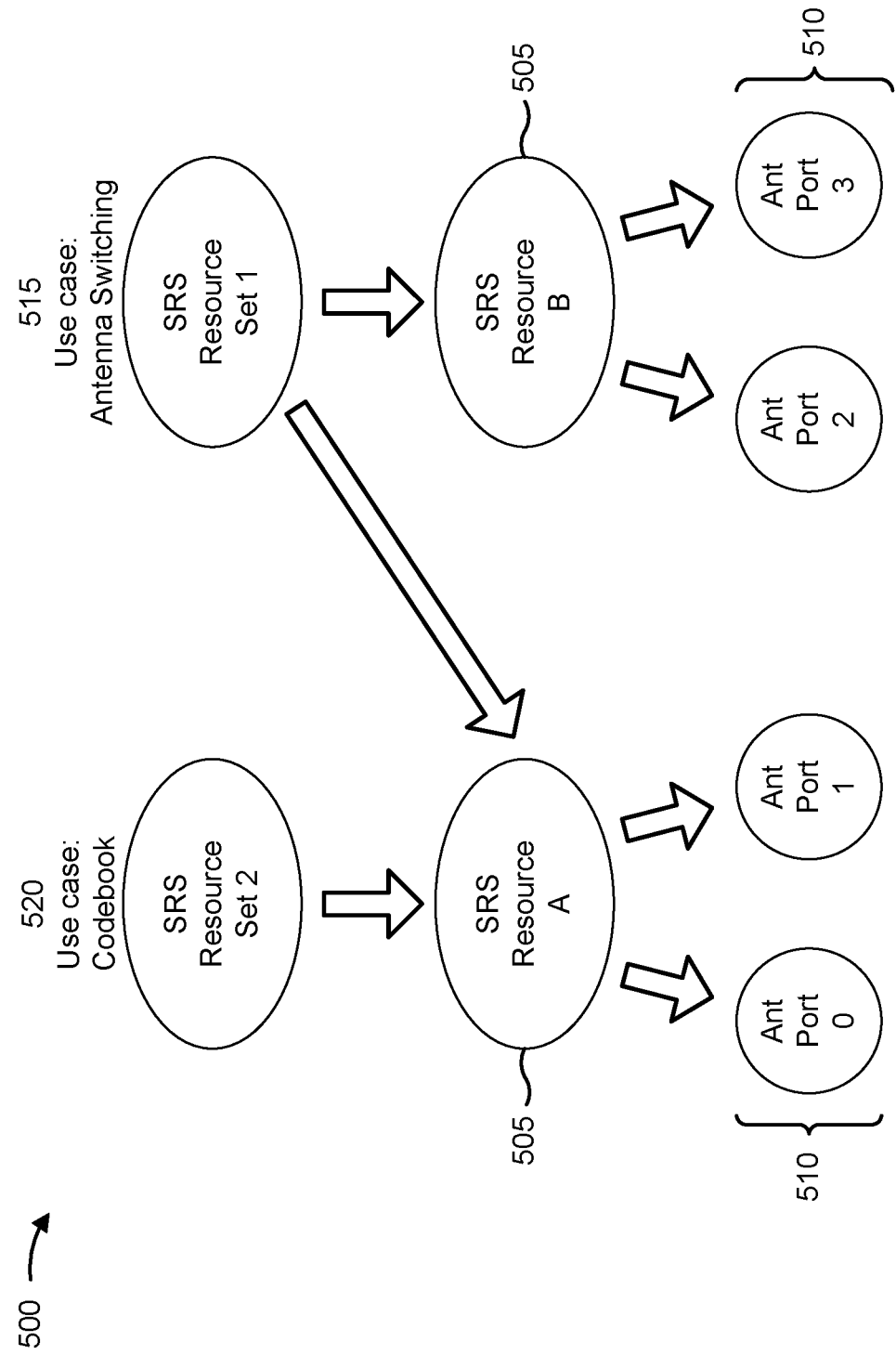
FIG. 5 is a diagram illustrating an example of sounding reference signal (SRS) resource sets, in accordance with the present disclosure.

FIG. 5 is a diagram illustrating an example 500 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 505, an SRS resource set may include one or more resources (e.g., shown as SRS resources), which may include time resources and/or frequency resources (e.g., a slot, a symbol, a resource block, and/or a periodicity for the time resources).

As shown by reference number 510, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a control element (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may be mapped to a corresponding symbol of the SRS resource and used for transmission of an SRS in that symbol.

As shown in FIG. 5, in some aspects, different SRS resource sets indicated to the UE 120 (e.g., having different use cases) may overlap (e.g., in time and/or in frequency, such as in the same slot). For example, as shown by reference number 515, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 520, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some aspects, multiple UEs may transmit SRSs using overlapping time and/or frequency resources, which may cause interference at a receiver (e.g., a base station 110 or other network entity). Accordingly, in some aspects, an SRS resource and/or an SRS resource set may be configured with a cyclic shift such that SRSs originating from multiple UEs are orthogonal to one another in order to reduce interference at a receiver caused by the overlapping SRSs. Aspects of overlapping SRSs are described in more detail in connection with FIG. 6.

As indicated above, FIG. 5 is provided as an example. Other examples may differ from what is described with regard to FIG. 5.

Figure 6:
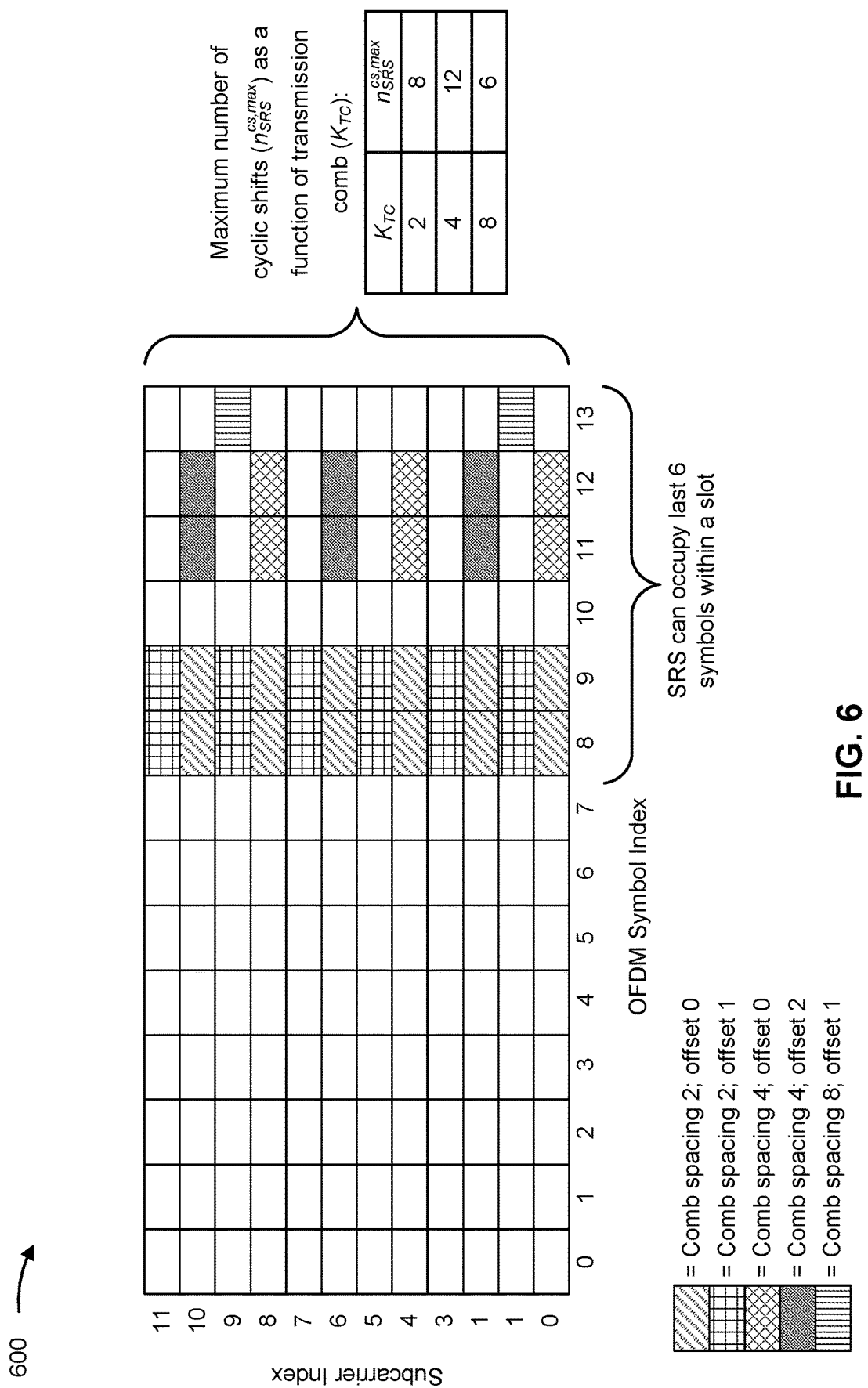
FIG. 6 is a diagram illustrating an example of time/frequency resources associated with an SRS, in accordance with the present disclosure.

FIG. 6 is a diagram illustrating an example 600 of time/frequency resources associated with an SRS, in accordance with the present disclosure.

The time/frequency resources shown in FIG. 6 include one slot in the time domain, which includes fourteen OFDM symbols indexed 0 to 13, and one resource block in the frequency domain, which includes twelve subcarriers indexed 0 to 11. In some aspects, an SRS transmission may occupy one, two, or four OFDM symbols in the time domain, which may be located within the last six symbols of the slot (e.g., the OFDM symbols indexed 8 to 13 in the depicted example). Moreover, an SRS transmission may occupy up to 272 resource blocks in the frequency domain. However, an individual UE may not transmit the SRS on every subcarrier, but instead may use a transmission comb to select a specific set of subcarriers.

For example, the UE may select subcarriers using a configured transmission comb spacing ($K_{TC}$) of 2, 4, or 8. A transmission comb spacing of 2 means that an individual UE transmits on every second subcarrier, as is illustrated in OFDM symbols 8 and 9 in FIG. 6. A transmission comb spacing of 4 means that an individual UE transmits on every fourth subcarrier, as is illustrated in OFDM symbols 11 and 12 in FIG. 6. And a transmission comb spacing of 8 means that an individual UE transmits on every eighth subcarrier, as is illustrated in OFDM symbol 13 in FIG. 6. An SRS resource may also be configured with a comb offset (sometimes referred to as Comb Offset, or $\bar{k}_{TC}$), which determines a starting resource element for the SRS. The comb offset may be configured as 0, 1, . . . , $K_{TC}-1$ per SRS resource. For example, a first SRS resource in OFDM symbols 8 and 9 in FIG. 6 is configured with a transmission comb spacing of 2 and a comb offset of 0, a second SRS resource in OFDM symbols 8 and 9 is configured with a transmission comb spacing of 2 and a comb offset of 1, a third SRS resource in OFDM symbols 11 and 12 is configured with a transmission comb spacing of 4 and a comb offset of 0, a fourth SRS resource in OFDM symbols 11 and 12 is configured with a transmission comb spacing of 4 and a comb offset of 2, and a fifth SRS resource in OFDM symbol 13 is configured with a transmission comb spacing of 8 and a comb offset of 3.

Each transmission comb allows multiple groups of UEs to be frequency multiplexed within a given OFDM symbol. For example, a transmission comb spacing of 2 permits two groups of UEs to be frequency multiplexed with a single subcarrier offset between the two groups, as is shown in OFDM symbols 8 and 9. A transmission comb spacing of 4 permits up to four groups of UEs to be frequency multiplexed within an OFDM symbol. And a transmission comb spacing of 8 permits up to eight groups of UEs to be frequency multiplexed within an OFDM symbol. As transmission comb spacing increases, the quality of the SRS measurements may be reduced because fewer resource elements are used to transmit the SRS.

Moreover, multiple SRSs may be sent in a given resource element (e.g., a group of UEs may utilize the same SRS resource) because each UE may be configured to transmit, as the SRS, a base sequence (e.g., a Zadoff-Chu sequence) with a specific cyclic shift. A length of the base sequence may be equal to a number of allocated resource elements for the SRS, and thus is dependent on the number of resource blocks allocated for the SRS (which may be up to 272 resource blocks) and the transmission comb spacing used (which may be 2, 4, or 8, as described). The base sequence may be selected such that, when each SRS is shifted according to the configured cyclic shift, the SRSs are orthogonalized Thus, a first SRS transmitted by a first UE according to a first cyclic shift will be orthogonal to a second SRS transmitted by a second UE according to a second cyclic shift, and thus may be transmitted using the same SRS resource with little interference at the receiver (e.g., base station or the like). The number of cyclic shifts ($n_{SRS}^{cs,max}$) available for a given SRS resource may be dependent on the transmission comb spacing being used to transmit the SRS. For example, there may be eight cyclic shifts available when using a transmission comb spacing of 2, twelve cyclic shifts available when using a transmission comb spacing of 4, and six cyclic shifts available when using a transmission comb spacing of 6. Each UE may be configured with a cyclic shift index ($n_{SRS}^{cs}$), which may be configured as 0, 1 . . . $n_{SRS}^{cs,max}$−1 per SRS resource. In addition to different cyclic shifts being allocated to different UEs, when a UE is using multiple ports to transmit the SRS, different cyclic shifts may be allocated to different antenna ports (e.g., a UE which transmits the SRS from four antenna ports may be configured with four cyclic shifts).

In some aspects, $\bar{r}_{u,v}(n)$ may be used to represent the base sequence to be transmitted as the SRS (with 0≤n<the length of the sequence), and $a_i$ may be a cyclic shift applied to the base sequence. In such aspects, the sequence transmitted by a UE may be equal to $e^{j\alpha_i n} \times r_{u,v}(n)$ The cyclic shift, $\alpha_i$, may be equal to $2\pi n_{SRS}^{cs,i}/n_{SRS}^{cs,max}$, with $n_{SRS}^{cs,i}$ being equal to $$\left(n_{SRS}^{cs} + \frac{n_{SRS}^{cs,max}(pi - 1000)}{N_{ap}^{SRS}}\right) \bmod n_{SRS}^{cs,max},$$

with $p_i$ corresponding to the antenna port number used to transmit the SRS (which may be 1000, 1001, 1002, or 1003), and with $N_{ap}^{SRS}$ corresponding to the number of allocated antenna ports (which sometimes may be referred to as nroJSRS-Ports). Thus, $\alpha_i$ may be equal to {0, 1, 2, . . . 5, 6, 7}×2π/8 when using a transmission comb spacing of 2, may be equal to {0, 1, 2, . . . 9, 10, 11}×2π/12 when using a transmission comb spacing of 4, and may be equal to {0, 1, 2, 3, 4, 5}×2π/6 when using a transmission comb spacing of 8. Applying the cyclic shift to the base sequence in the manner described ensures mutual orthogonality among all antenna ports of a given SRS resource, and/or among different SRS resources of the same or different UEs.

Moreover, in some aspects, multiple base sequences (e.g., multiple $\bar{r}_{u,v}(n)$) of flexible length may be available for use as the SRS. The particular sequence (e.g., $\bar{r}_{u,v}(n)$) to be used by a UE may be determined using two steps. The first step selects a group of sequences. In some aspects, for a given length of SRS, there may be 30 groups of sequences, and these groups may be indexed using the variable u (e.g., u∈{0, 1, . . . , 29}). The second step selects a sequence from within the group. Each group may include one sequence for sequences having a length less than 72, indexed as v=0, and may include two sequences for sequences having a length greater than or equal to 72, indexed as v∈{1, 2}. In some aspects, different base sequences (different (u, v)) may not be completely orthogonal but may nonetheless exhibit low cross-correlation such that interference between SRSs of different base sequences at the receiver is low.

The group, u, may be selected according to the equation u=($f_{gh}(n_{s,f}^{\mu},l')+n_{ID}^{SRS}$) mod 30, where $n_{ID}^{SRS}$ is an SRS sequence identity configured per SRS resource, and the component $f_{gh}(n_{s,f}^{\mu},l')$ is dependent on whether group or sequence hopping is configured for the SRS resource, which may be indicated using a group or sequence hopping parameter (sometimes referred to as groupOrSequenceHopping). Group or sequence hopping may be used to pseudo-randomly switch between groups of sequences used for an SRS resource (e.g., u) or to pseudo-randomly switch between sequences within groups used for an SRS resource (e.g., v) in an effort to randomize interference at the receiver. If the group or sequence hopping parameter (e.g., groupOrSequenceHopping) indicates that neither group nor sequence hopping is to be utilized, $f_{gh}(n_{s,f}^{\mu},l')$=0 and v=0, and thus the group index only depends on the SRS sequence identity (e.g., u=$n_{ID}^{SRS}$ mod 30). In such aspects, the base sequence is fixed in all OFDM symbols in all SRS slots for the SRS transmission in that SRS resource. Thus, for such aspects, a network entity (e.g., a base station) configuring one or more SRS resources may utilize interference planning techniques to minimize interference at the receiver, such as carefully assigning respective SRS sequence identities (e.g., $n_{ID}^{SRS}$) to different SRS resources of different UEs to avoid interference at the receiver (e.g., neighboring cells may be configured with values that generate different results from $n_{ID}^{SRS}$ mod 30 to ensure that neighboring cells use different groups of sequences).

If the group or sequence hopping parameter (e.g., groupOrSequenceHopping) indicates that group hopping should be utilized, then v=0 while $f_{gh}(n_{s,f}^{\mu},l')$ generates a pseudo-random result dependent on slot and symbol timing, with $n_{s,f}^{\mu}$ corresponding to the slot number within the radio frame for subcarrier spacing u, and 1' corresponding to a symbol number within the slot. More particularly, $f_{gh}(n_{s,f}^{\mu},l')$=($\sum_{m=0}^{7} c(8(n_{s,f}^{\mu}N_{symb}^{slot}+l_0+l')+m) \times 2^m$) mod 30, where c(i) is a pseudo-random sequence that is initialized as $c_{init}=n_{ID}^{SRS}$ at the beginning of each radio frame.

If the group or sequence hopping parameter (e.g., groupOrSequenceHopping) indicates that sequence hopping should be utilized, then $f_{gh}(n_{s,f}^{\mu},l')$=0 (e.g., the group index only depends on the SRS sequence identity (e.g., u=$n_{ID}^{SRS}$ mod 30)) while v is based upon a pseudo-random result dependent on slot and symbol timing. More particularly, $$v = \begin{cases} c(n_{s,f}^{\mu}N_{symb}^{slot} + l_0 + l') & M_{sc,b}^{SRS} \geq 6N_{sc}^{RB} \\ 0 & \text{otherwise} \end{cases},$$

where c(i) is a pseudo-random sequence that is initialized as $c_{init}=n_{ID}^{SRS}$ at the beginning of each radio frame.

Moreover, in some aspects, frequency hopping may be used to pseudo-randomly switch between frequency bands used to transmit the SRS, also in an effort to randomize interference at the receiver. More particularly, when the SRS spans less than a maximum bandwidth for SRS transmissions (e.g., 272 resource blocks), then an SRS resource may be configured with frequency hopping such that the SRS is transmitted using different portions (e.g., different frequency hops) of the SRS bandwidth.

Although the interference planning, group hopping, sequence hopping, and/or frequency hopping techniques described above may reduce and/or randomize some SRS interference at a receiver, SRSs may nonetheless still interfere with one another. For example, in coherent joint transmission (CJT) schemes, one or more UEs are coherently served by multiple TRPs (e.g., a cluster of TRPs), and thus the network may need information about channels between each TRP and a given UE in order to select transmission weights or other transmission parameters. Accordingly, each TRP of the multiple TRPs may need to receive SRS transmissions from a given UE, requiring the UE to transmit an SRS transmission with a large amount of power, thus increasing the likelihood of the SRS transmission reaching other network entities and causing interference. This may be particularly problematic when a large number of CJT UEs are near to one another, requiring multiple UEs to send SRS transmissions on the same OFDM symbols, thus increasing the likelihood of inter-cell and/or inter-cluster interference at the various receivers. In such scenarios, the above interference mitigation techniques may insufficiently mitigate SRS interference, leading to degraded SRS reception and channel quality, and overall poor link performance including high latency, low throughput, and link failure.

Some techniques and apparatuses described herein enable reduced SRS interference by pseudo-randomly muting SRS transmissions. For example, in some aspects, an SRS resource may be configured with a pseudo-random sequence for muting an SRS associated with the SRS resource, and the UE may transmit the SRS using the SRS resource based at least in part on the pseudo-random sequence. The pseudo-random sequence may be used to determine whether, at a given time, the UE should transmit the SRS (e.g., the SRS should not be muted) or not transmit the SRS (e.g., the SRS should be muted). In some aspects, the UE may determine whether or not to transmit the SRS based at least in part on performing a modulo operation between a pseudo-random number associated with the pseudo-random sequence and an integer and/or by comparing a result of the modulo operation between the pseudo-random number and the integer to a threshold. The pseudo-random sequence may be a function of time and, in some aspects, may be a function of one or more additional parameters to increase randomness, such as one or more of a comb offset index, a cyclic shift index, or an SRS sequence index (e.g., a group index or sequence index within the group) associated with the SRS resource. Pseudo-randomly muting SRS transmissions may beneficially decrease interference levels at a receiver because, at a given time, SRSs for some UEs may be muted, thus decreasing SRS density in a given resource, and/or because different combinations of UEs may simultaneously transmit SRSs in different transmission instances (e.g., in different slots and/or/symbols), avoiding consistent SRS interference at the receiver. As a result, SRS interference may be further mitigated as compared to group hopping, sequence hopping, frequency hopping, and similar techniques, leading to improved SRS reception and channel quality, including lower latency, higher throughput, and increased coverage.

As indicated above, FIG. 6 is provided as an example. Other examples may differ from what is described with regard to FIG. 6.

Figure 7:
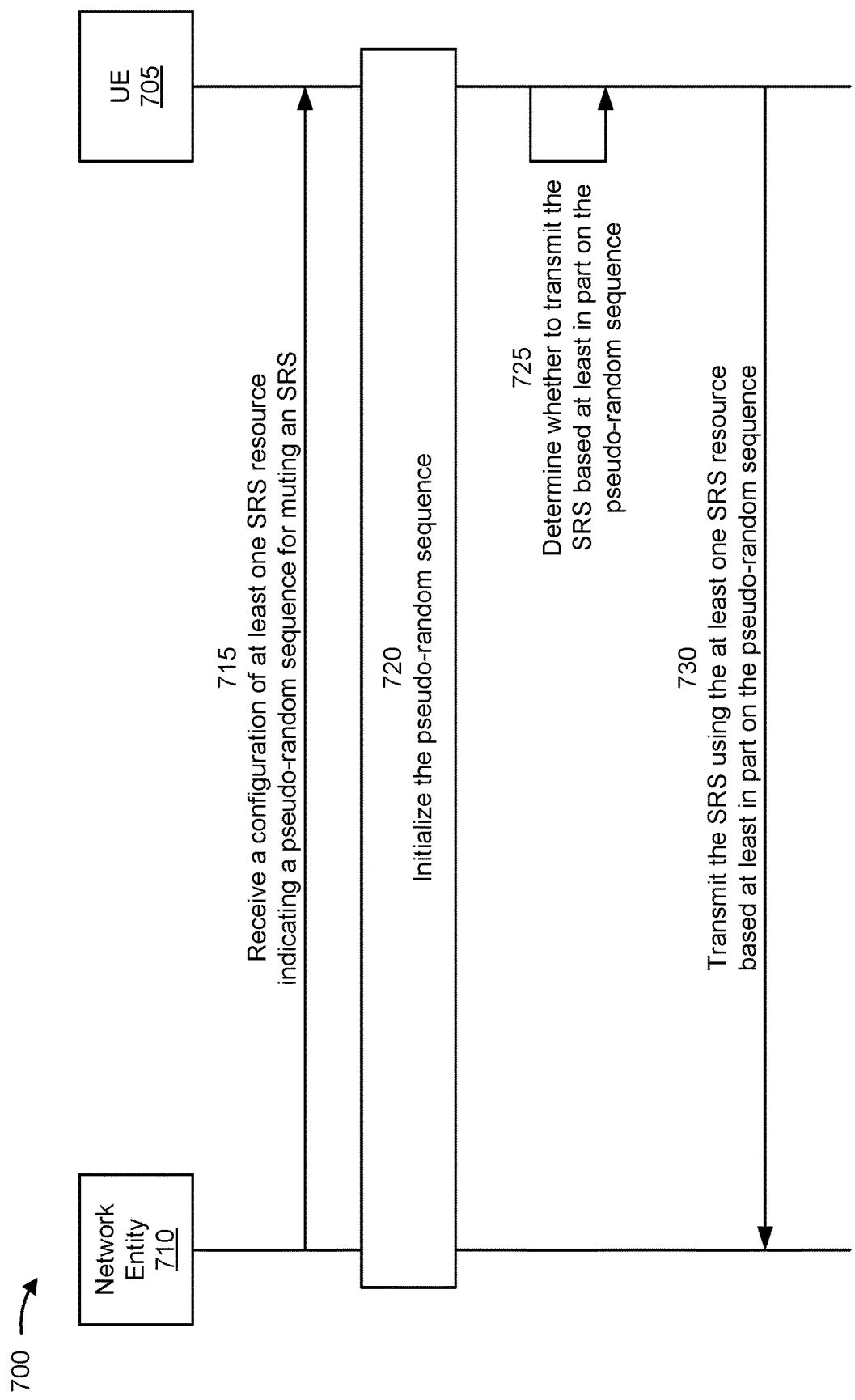
FIG. 7 is a diagram illustrating an example associated with interference mitigation by pseudo-random muting for SRSs, in accordance with the present disclosure.

FIG. 7 is a diagram illustrating an example 700 associated with interference mitigation by pseudo-random muting for SRSs, in accordance with the present disclosure. As shown in FIG. 7, a UE 705 and a network entity 710 may communicate with one another. In some aspects, the UE 705 may correspond to the UE 120, and the network entity 710 may correspond to any of the network entities described herein, such as a base station 110, a TRP, a CU 310, a DU 330, an RU 340, or a similar network entity.

As shown by reference number 715, the UE 705 may receive, from the network entity 710, a configuration of at least one SRS resource, wherein the configuration indicates a pseudo-random sequence (sometimes referred to as c(•)) for muting an SRS associated with the at least one SRS resource. In some aspects, the configuration indicated by reference number 715 may be received via an RRC message. Moreover, the configuration indicated by reference number 715 may be associated with an SRS resource and/or an SRS resource set. That is, in some aspects, the configuration of the at least one SRS resource is associated with a single SRS resource (such as one of SRS Resource A or SRS resource B described in connection with FIG. 5), while in some other aspects, the configuration of the at least one SRS resource is associated with an SRS resource set including multiple SRS resources (such as one of SRS resource set 1 or SRS resource set 2 described in connection with FIG. 5). The pseudo-random sequence may be used to indicate to the UE 705 whether or not the UE 705 should transmit the SRS at a particular time, as described in more detail below in connection with reference numbers 725 and 730.

As shown by reference number 720, in some aspects, the UE 705 and/or the network entity 710 may initialize the pseudo-random sequence (e.g., c(•)) at the beginning of each radio frame associated with the SRS transmission. In some aspects, the pseudo-random sequence may be initialized based at least in part on an SRS sequence identity configured for the at least one SRS resource (e.g., $n_{ID}^{SRS}$ described in connection with FIG. 6). More particularly, the pseudo-random sequence may be initialized as $c_{init}$ at the beginning of each radio frame, with $c_{init}=n_{ID}^{SRS}$. In some aspects, a network entity (e.g., network entity 710) may configure the same SRS sequence identity (e.g., $n_{ID}^{SRS}$) for intra-cell or intra-cluster UEs, and may configure different SRS sequence identities for inter-cell or inter-cluster UEs. Thus, initializing the pseudo-random sequence based at least in part on the SRS sequence identity may beneficially result in inter-cell or inter-cluster interference randomization because UEs in different cells and/or clusters may not have the same outcome of muting and/or transmitting in all slots because the pseudo-random sequence initialization is not the same.

In some other aspects, the pseudo-random sequence may be initialized at a beginning of each radio frame based at least in part on a parameter configured by the network entity 710 (via RRC configuration or the like). For example, in some aspects, the UE 705 may receive, from the network entity 710, a configuration of a pseudo-random sequence initialization parameter (which may be different than the SRS sequence identify), and the pseudo-random sequence may be initialized at a beginning of each radio frame based at least in part on the pseudo-random sequence initialization parameter. Beneficially, in such aspects, the pseudo-random sequence may be decoupled from the SRS sequence identity (e.g., $n_{ID}^{SRS}$), further randomizing SRS interference. In some aspects, a network entity (e.g., network entity 710) may configure multiple UEs with the same pseudo-random sequence initialization parameter when, for example, the UEs are far from each other, such that they do not create interference to each other's intended receiver, and/or when the configured SRS parameters at each UE (e.g., $K_{TC}$, $n_{SRS}^{cs}$, $n_{ID}^{SRS}$, u, v, groupOrSequenceHopping, or the like) may result in orthogonalization. In some aspects, a network entity (e.g., network entity 710) may configure different UEs with different pseudo-random sequence initialization parameters when, for example, the UEs are close to each other, such that they may create interference to each other's intended receiver, and/or when the configured SRS parameters at each UE (e.g., $K_{TC}$, $n_{SRS}^{cs}$, $n_{ID}^{SRS}$, u, v, groupOrSequenceHopping, or the like) may not result in orthogonalization Put another way, if two UEs have the same pseudo-random sequence initialization parameter, then at a given time both UEs may be muted or else both may be transmitting (e.g., there is no interference randomization). Thus, a network entity (e.g., network entity 710) may only configure two UEs with the same pseudo-random sequence initialization parameter if the UEs' SRS transmissions do not create interference and/or if the UEs' SRS transmissions are orthogonal.

As shown by reference number 725, the UE 705 may determine, at a given time, whether to transmit the SRS based at least in part on the pseudo-random sequence. In some aspects, the pseudo-random sequence may be used to generate a pseudo-random number, sometimes referred to as $f_{muting}(t)$, at a particular time, t. The particular time, t, may correspond to a slot number or a symbol number of the SRS resource. Put another way, in some aspects, the UE 705 may determine whether to transmit the SRS using a slot granularity, while in some other aspects, the UE 705 may determine whether or to transmit the SRS using a symbol granularity.

When the determination is performed using a symbol granularity, the UE 705 may separately determine whether to transmit the SRS in each symbol of the SRS resource. For example, $f_{muting}(n_{s,f}^{\mu}, l')$ may be equal to $\Sigma_{m=0}^{M-1} c(M \times (n_{s,f}^{\mu} N_{symb}^{slot} + l_0 + l') + m) \times 2^m$, with $n_{s,f}^{\mu}$ corresponding to the slot number with the radio frame for subcarrier spacing $\mu$, $l'$ corresponding to the symbol number within the SRS resource, $l_0$ corresponding to the first symbol of the SRS resource in the slot (such that $l_0 + l'$ is equal to the symbol index within the slot), and c corresponding to the pseudo-random sequence. When the determination is performed using a slot granularity, the UE 705 may determine whether to transmit the SRS in each slot of the SRS resource. For example, $f_{muting}(n_{s,f}^{\mu})$ may be equal to $\Sigma_{m=0}^{M-1} c (M \times N_{symb}^{slot} + m) \times 2^m$, or $\Sigma_{m=0}^{M-1} c(M \times (n_{s,f}^{\mu} N_{symb}^{slot} + l_0) + m) \times 2^m$. In such aspects, the random number (e.g., $f_{muting}(t)$) may be a function of the first symbol of the SRS resource within the slot, but may not change within the slot.

Moreover, in addition to being a function of time, the pseudo-random number (e.g., $f_{muting}(t)$) may be a function of one or more additional parameters in order to provide additional randomization to the SRS transmission. For example, in some aspects, the pseudo-random number may further be a function of a comb offset index associated with the at least one SRS resource (e.g., $K_{TC}$ described in connection with FIG. 6). Additionally, or alternatively, the pseudo-random number may further be a function of a cyclic shift index associated with the at least one SRS resource (e.g., $n_{SRS}^{cs}$ described in connection with FIG. 6). Additionally, or alternatively, the pseudo-random number may further be a function of an SRS sequence index associated with the at least one SRS resource (e.g., at least one of u or v described in connection with FIG. 5). Put another way, the pseudo-random sequence may indicate whether to transmit the SRS as a function of at least one of a comb offset index associated with the at least one SRS resource, a cyclic shift index associated with the at least one SRS resource, or an SRS sequence index associated with the at least one SRS resource.

Additionally, or alternatively, when the at least one SRS resource is associated with multiple frequency hops, the pseudo-random sequence may indicate whether to transmit the SRS in each frequency hop, of the multiple frequency hops. Put another way, the pseudo-random number may further be a function of a frequency hop associated with the at least one SRS resource. More particularly, $f_{muting}(n_{s,f}^{\mu}, hop)$ may be equal to $\Sigma_{m=0}^{M-1} c(M \times (n_{s,f}^{\mu} N_{symb}^{slot} + l_0^{hop}) + m) \times 2^m$, with $l_0^{hop}$ corresponding to the hop index and/or the first symbol of the frequency hop.

In some aspects, the determination may be based at least in part on a result of a modulo operation between the pseudo-random number associated with the pseudo-random sequence at a given time (e.g., $f_{muting}(t)$) and an integer. For example, in some aspects, the integer may be 2. In such aspects, a result of the modulo operation between the pseudo-random number and the integer (e.g., $f_{muting}$ mod 2) will be equal to either 0 or 1. A result of 0 or 1 may indicate that the UE 705 should transmit the SRS, while a result of the other one of 0 or 1 may indicate that the UE 705 should not transmit the SRS. In such aspects, the modulo operation may result in a muting probability of ½ (e.g., the UE 705 will mute the SRS transmission approximately half of the time). In some other aspects, the integer may be a different integer than 2 without departing from the scope of the disclosure.

Moreover, in some aspects, the pseudo-random sequence may further indicate whether to transmit the SRS based at least in part on a comparison of a result of the modulo operation between the pseudo-random number and the integer to the threshold value. Put another way, the determination shown by reference number 725 may further be based at least in part on comparing the result of the modulo operation between the pseudo-random number and the integer (e.g., K) with a threshold value (sometimes referred to as k). In some aspects, the threshold value may be less than the integer (e.g., k<K). Moreover, in some aspects, the result of the modulo operation between the pseudo-random number and the integer being greater than the threshold value (e.g., $f_{muting}$ mod K>k) may indicate that the UE 705 should transmit the SRS, and the result of the modulo operation between the pseudo-random number and the integer being equal to or less than the threshold value (e.g., $f_{muting}$ mod K≤k) may indicate that the UE 705 should not transmit the SRS. In such aspects, the modulo operation may result in a muting probability of k/K. Moreover, in some aspects, the values of K and k may be configured by the network entity 710 (such as for purposes of controlling the probability of muting per SRS resource), and thus may be transmitted to the UE 705 via an RRC message. For example, in some aspects, the values of K and k may be indicated via the configuration described in connection with reference number 715, or via a similar configuration message.

As shown by reference number 730, the UE 705 may transmit the SRS using the at least one SRS resource based at least in part on the pseudo-random sequence. More particularly, the UE 705 may periodically mute the SRS based at least in part on the pseudo-random sequence, as described above. This may include, at a given time, muting the SRS based at least in part on performing a modulo operation between the pseudo-random number (e.g., $f_{muting}(t)$) and an integer (e.g., K) and/or by comparing a result of the modulo operation between the pseudo-random number and the integer to a threshold value (e.g., k). As described, the pseudo-random number may be time dependent (e.g., dependent on a slot or symbol of the SRS resource) and/or may be dependent on one or more of a comb offset index, a cyclic shift index, or an SRS sequence index (e.g., a group index (e.g., u) or a sequence index (e.g., v)) associated with the at least one SRS resource. By pseudo-randomly muting SRS transmissions in the manner described, the UE 705 may beneficially decrease interference levels at the network entity 710 while creating varying combinations of SRSs received at the network entity, thus avoiding consistent SRS interference in the system. As a result, SRS interference may be further mitigated as compared to only group hopping, sequence hopping, and similar techniques, as discussed.

As indicated above, FIG. 7 is provided as an example. Other examples may differ from what is described with respect to FIG. 7.

Figure 8:
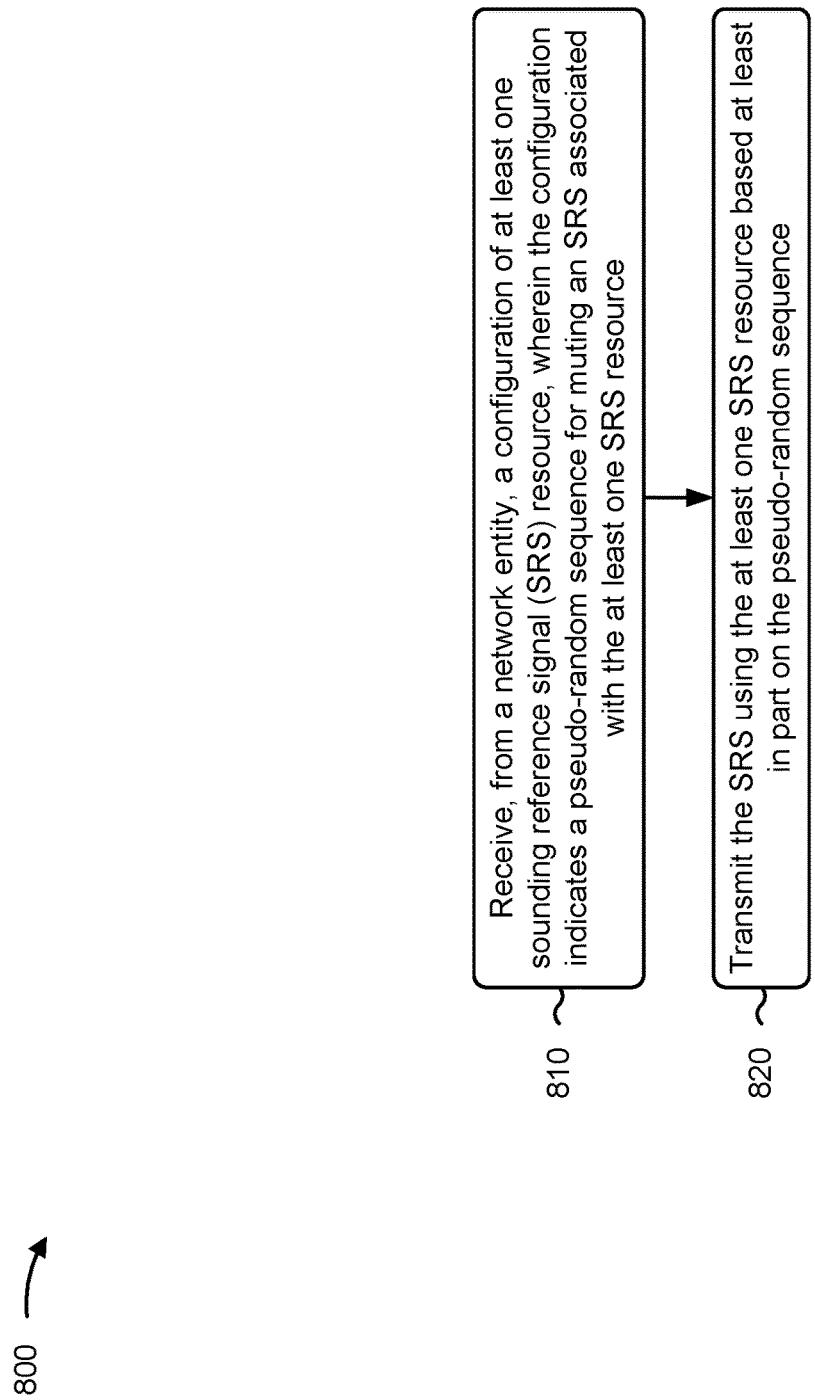
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 705) performs operations associated with interference mitigation by pseudo-random muting for SRSs.

As shown in FIG. 8, in some aspects, process 800 may include receiving, from a network entity, a configuration of at least one SRS resource, wherein the configuration indicates a pseudo-random sequence for muting an SRS associated with the at least one SRS resource (block 810). For example, the UE (e.g., using communication manager 1008 and/or reception component 1002, depicted in FIG. 10) may receive, from a network entity, a configuration of at least one SRS resource, wherein the configuration indicates a pseudo-random sequence for muting an SRS associated with the at least one SRS resource, as described above.

As further shown in FIG. 8, in some aspects, process 800 may include transmitting the SRS using the at least one SRS resource based at least in part on the pseudo-random sequence (block 820). For example, the UE (e.g., using communication manager 1008 and/or transmission component 1004, depicted in FIG. 10) may transmit the SRS using the at least one SRS resource based at least in part on the pseudo-random sequence, as described above.

Process 800 may include additional aspects, such as any single aspect or any combination of aspects described below and/or in connection with one or more other processes described elsewhere herein.

In a first aspect, the configuration of the at least one SRS resource is received via an RRC message.

In a second aspect, alone or in combination with the first aspect, the configuration of the at least one SRS resource is associated with a single SRS resource.

In a third aspect, alone or in combination with one or more of the first and second aspects, the configuration of the at least one SRS resource is associated with an SRS resource set including multiple SRS resources.

In a fourth aspect, alone or in combination with one or more of the first through third aspects, the pseudo-random sequence indicates whether to transmit the SRS as a function of time.

In a fifth aspect, alone or in combination with one or more of the first through fourth aspects, the pseudo-random sequence indicates whether to transmit the SRS as a function of time based at least in part on performing a modulo operation between a pseudo-random number associated with the pseudo-random sequence and an integer.

In a sixth aspect, alone or in combination with one or more of the first through fifth aspects, the integer is 2, a result of the modulo operation between the pseudo-random number and the integer being equal to one of 0 or 1 indicates that the UE should transmit the SRS, and the result of the modulo operation between the pseudo-random number and the integer being equal to the other one of 0 or 1 indicates that the UE should not transmit the SRS.

In a seventh aspect, alone or in combination with one or more of the first through sixth aspects, the pseudo-random sequence further indicates whether to transmit the SRS based at least in part on a comparison of a result of the modulo operation between the pseudo-random number and the integer to a threshold value.

In an eighth aspect, alone or in combination with one or more of the first through seventh aspects, the threshold value is less than the integer.

In a ninth aspect, alone or in combination with one or more of the first through eighth aspects, the result of the modulo operation between the pseudo-random number and the integer being greater than the threshold value indicates that the UE should transmit the SRS, and the result of the modulo operation between the pseudo-random number and the integer being equal to or less than the threshold value indicates that the UE should not transmit the SRS.

In a tenth aspect, alone or in combination with one or more of the first through ninth aspects, the pseudo-random sequence indicates whether to transmit the SRS as a function of at least one of a comb offset index associated with the at least one SRS resource, a cyclic shift index associated with the at least one SRS resource, or an SRS sequence index associated with the at least one SRS resource.

In an eleventh aspect, alone or in combination with one or more of the first through tenth aspects, each SRS resource of the at least one SRS resource includes multiple SRS symbols, and the pseudo-random sequence indicates whether to transmit the SRS in each SRS symbol, of the multiple SRS symbols.

In a twelfth aspect, alone or in combination with one or more of the first through eleventh aspects, each SRS resource of the at least one SRS resource is associated with a slot, and the pseudo-random sequence indicates whether to transmit the SRS in each slot.

In a thirteenth aspect, alone or in combination with one or more of the first through twelfth aspects, each SRS resource of the at least one SRS resource includes multiple frequency hops, and the pseudo-random sequence indicates whether to transmit the SRS in each frequency hop, of the multiple frequency hops.

In a fourteenth aspect, alone or in combination with one or more of the first through thirteenth aspects, the pseudo-random sequence is initialized at a beginning of each radio frame based at least in part on an SRS sequence identity configured for the at least one SRS resource.

In a fifteenth aspect, alone or in combination with one or more of the first through fourteenth aspects, process 800 includes receiving, from the network entity, a configuration of a pseudo-random sequence initialization parameter, wherein the pseudo-random sequence is initialized at a beginning of each radio frame based at least in part on the pseudo-random sequence initialization parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
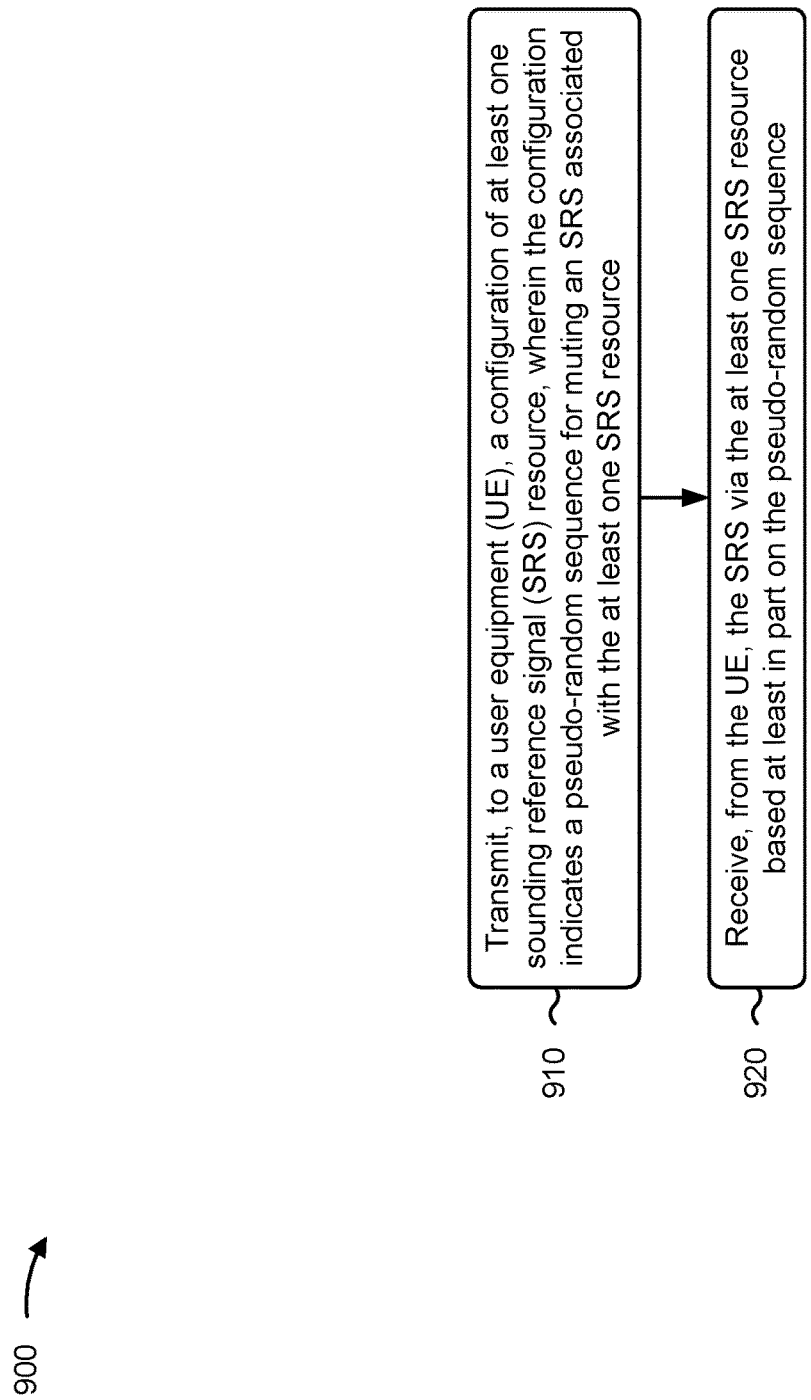
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., network entity 710) performs operations associated with interference mitigation by pseudo-random muting for SRSs.

As shown in FIG. 9, in some aspects, process 900 may include transmitting, to a UE, a configuration of at least one SRS resource, wherein the configuration indicates a pseudo-random sequence for muting an SRS associated with the at least one SRS resource (block 910). For example, the network entity (e.g., using communication manager 1108 and/or transmission component 1104, depicted in FIG. 11) may transmit, to a UE, a configuration of at least one SRS resource, wherein the configuration indicates a pseudo-random sequence for muting an SRS associated with the at least one SRS resource, as described above.

As further shown in FIG. 9, in some aspects, process 900 may include receiving, from the UE, the SRS via the at least one SRS resource based at least in part on the pseudo-random sequence (block 920). For example, the network entity (e.g., using communication manager 1108 and/or reception component 1102, depicted in FIG. 11) may receive, from the UE, the SRS via the at least one SRS resource based at least in part on the pseudo-random sequence, as described above.

Process 900 may include additional aspects, such as any single aspect or any combination of aspects described below and/or in connection with one or more other processes described elsewhere herein.

In a first aspect, the configuration of the at least one SRS resource is transmitted via an RRC message.

In a second aspect, alone or in combination with the first aspect, the configuration of the at least one SRS resource is associated with a single SRS resource.

In a third aspect, alone or in combination with one or more of the first and second aspects, the configuration of the at least one SRS resource is associated with an SRS resource set including multiple SRS resources.

In a fourth aspect, alone or in combination with one or more of the first through third aspects, the pseudo-random sequence indicates whether to transmit the SRS as a function of time.

In a fifth aspect, alone or in combination with one or more of the first through fourth aspects, the pseudo-random sequence indicates whether to transmit the SRS as a function of time based at least in part on a performance of a modulo operation between a pseudo-random number associated with the pseudo-random sequence and an integer.

In a sixth aspect, alone or in combination with one or more of the first through fifth aspects, the integer is 2, a result of the modulo operation between the pseudo-random number and the integer being equal to one of 0 or 1 indicates that the UE should transmit the SRS, and the result of the modulo operation between the pseudo-random number and the integer being equal to the other one of 0 or 1 indicates that the UE should not transmit the SRS.

In a seventh aspect, alone or in combination with one or more of the first through sixth aspects, the pseudo-random sequence further indicates whether to transmit the SRS based at least in part on a comparison of a result of the modulo operation between the pseudo-random number and the integer to a threshold value.

In an eighth aspect, alone or in combination with one or more of the first through seventh aspects, the threshold value is less than the integer.

In a ninth aspect, alone or in combination with one or more of the first through eighth aspects, the result of the modulo operation between the pseudo-random number and the integer being greater than the threshold value indicates that the UE should transmit the SRS, and the result of the modulo operation between the pseudo-random number and the integer being equal to or less than the threshold value indicates that the UE should not transmit the SRS.

In a tenth aspect, alone or in combination with one or more of the first through ninth aspects, the pseudo-random sequence indicates whether to transmit the SRS as a function of at least one of a comb offset index associated with the at least one SRS resource, a cyclic shift index associated with the at least one SRS resource, or an SRS sequence index associated with the at least one SRS resource.

In an eleventh aspect, alone or in combination with one or more of the first through tenth aspects, each SRS resource of the at least one SRS resource includes multiple SRS symbols, and the pseudo-random sequence indicates whether to transmit the SRS in each SRS symbol, of the multiple SRS symbols.

In a twelfth aspect, alone or in combination with one or more of the first through eleventh aspects, each SRS resource of the at least one SRS resource is associated with a slot, and the pseudo-random sequence indicates whether to transmit the SRS in each slot.

In a thirteenth aspect, alone or in combination with one or more of the first through twelfth aspects, each SRS resource of the at least one SRS resource includes multiple frequency hops, and the pseudo-random sequence indicates whether to transmit the SRS in each frequency hop, of the multiple frequency hops.

In a fourteenth aspect, alone or in combination with one or more of the first through thirteenth aspects, the pseudo-random sequence is initialized at a beginning of each radio frame based at least in part on an SRS sequence identity configured for the at least one SRS resource.

In a fifteenth aspect, alone or in combination with one or more of the first through fourteenth aspects, process 900 includes transmitting, to the UE, a configuration of a pseudo-random sequence initialization parameter, wherein the pseudo-random sequence is initialized at a beginning of each radio frame based at least in part on the pseudo-random sequence initialization parameter.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
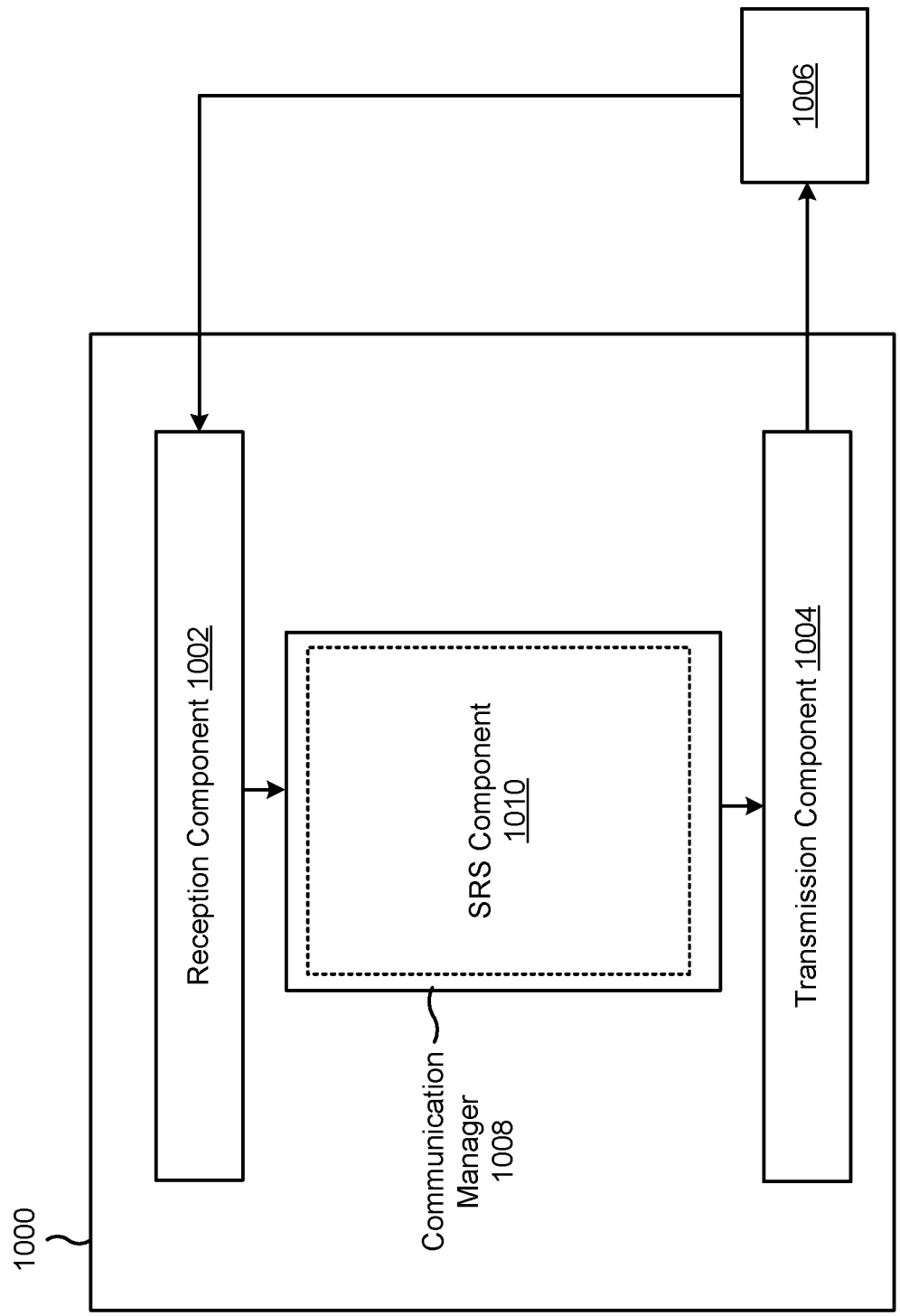
FIG. 10 is a diagram of an example apparatus for wireless communication, in accordance with the present invention.

FIG. 10 is a diagram of an example apparatus 1000 for wireless communication, in accordance with the present invention. The apparatus 1000 may be a UE (e.g., UE 705), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 140). The communication manager 1008 may include an SRS component 1010.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE 120 described in connection with FIG. 2. In some aspects, the transmission component 1004 may be co-located with the reception component 1002 in a transceiver.

The reception component 1002 and/or the SRS component 1010 may receive, from a network entity, a configuration of at least one SRS resource, wherein the configuration indicates a pseudo-random sequence for muting an SRS associated with the at least one SRS resource. The transmission component 1004 and/or the SRS component 1010 may transmit the SRS using the at least one SRS resource based at least in part on the pseudo-random sequence.

The reception component 1002 may receive, from the network entity, a configuration of a pseudo-random sequence initialization parameter, wherein the pseudo-random sequence is initialized at a beginning of each radio frame based at least in part on the pseudo-random sequence initialization parameter.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
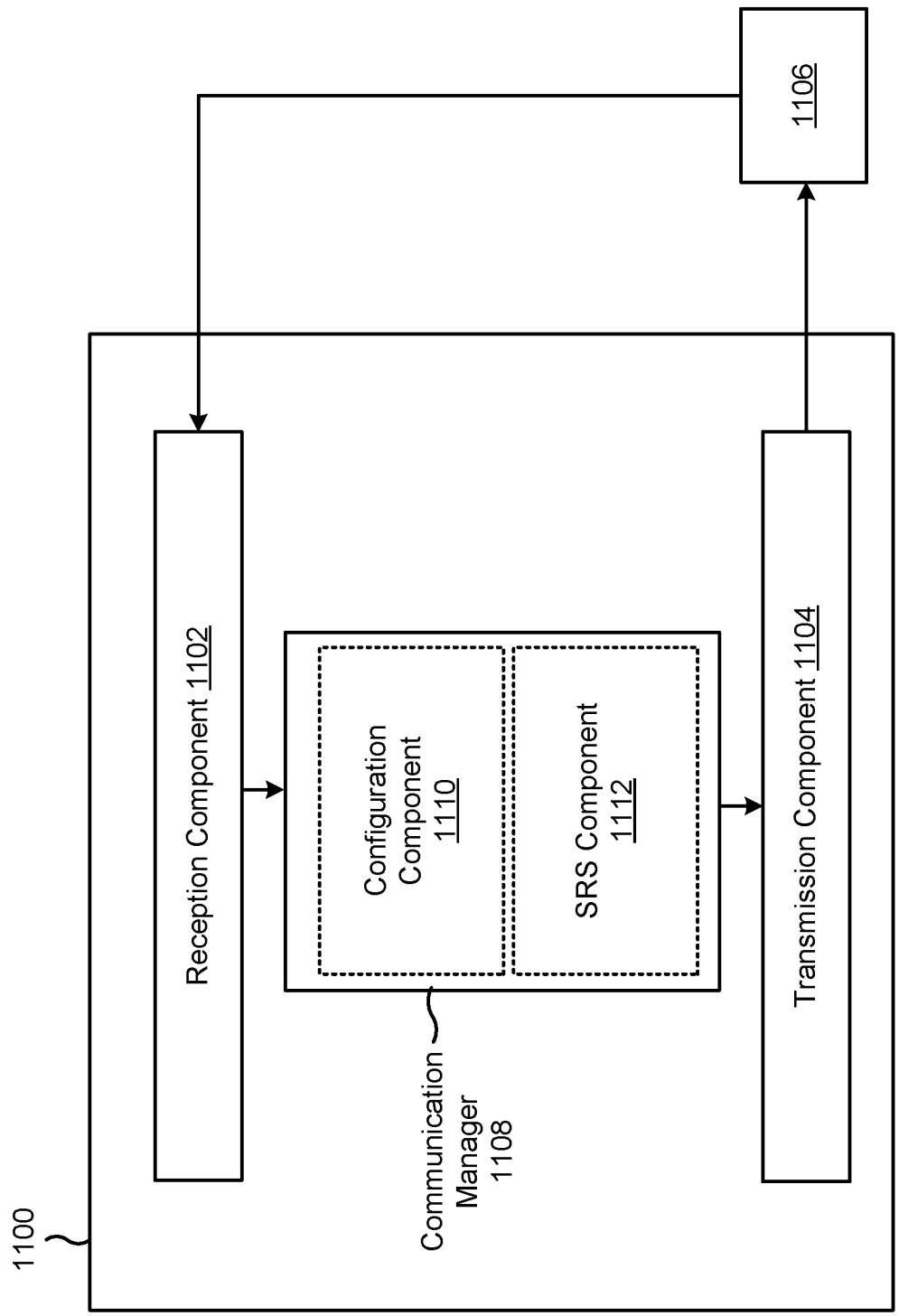
FIG. 11 is a diagram of an example apparatus for wireless communication, in accordance with the present invention.

FIG. 11 is a diagram of an example apparatus 1100 for wireless communication, in accordance with the present invention. The apparatus 1100 may be a network entity (e.g., network entity 710), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., communication manager 150). The communication manager 1108 may include one or more of a configuration component 1110, or an SRS component 1112, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station 110 described in connection with FIG. 2. In some aspects, the transmission component 1104 may be co-located with the reception component 1102 in a transceiver.

The transmission component 1104, the configuration component 1110, and/or the SRS component 1112 may transmit, to a UE, a configuration of at least one SRS resource, wherein the configuration indicates a pseudo-random sequence for muting an SRS associated with the at least one SRS resource. The reception component 1102 and/or the SRS component 1112 may receive, from the UE, the SRS via the at least one SRS resource based at least in part on the pseudo-random sequence.

The transmission component 1104, the configuration component 1110, and/or the SRS component 1112 may transmit, to the UE, a configuration of a pseudo-random sequence initialization parameter, wherein the pseudo-random sequence is initialized at a beginning of each radio frame based at least in part on the pseudo-random sequence initialization parameter.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving, from a network entity, a configuration of at least one SRS resource, wherein the configuration indicates a pseudo-random sequence for muting an SRS associated with the at least one SRS resource; and transmitting the SRS using the at least one SRS resource based at least in part on the pseudo-random sequence.

Aspect 2: The method of Aspect 1, wherein the configuration of the at least one SRS resource is received via an RRC message.

Aspect 3: The method of any of Aspects 1-2, wherein the configuration of the at least one SRS resource is associated with a single SRS resource.

Aspect 4: The method of any of Aspects 1-2, wherein the configuration of the at least one SRS resource is associated with an SRS resource set including multiple SRS resources.

Aspect 5: The method of any of Aspects 1-4, wherein the pseudo-random sequence indicates whether to transmit the SRS as a function of time.

Aspect 6: The method of Aspect 5, wherein the pseudo-random sequence indicates whether to transmit the SRS as a function of time based at least in part on performing a modulo operation between a pseudo-random number associated with the pseudo-random sequence and an integer.

Aspect 7: The method of Aspect 6, wherein the integer is 2, wherein a result of the modulo operation between the pseudo-random number and the integer being equal to one of 0 or 1 indicates that the UE should transmit the SRS, and wherein the result of the modulo operation between the pseudo-random number and the integer being equal to the other one of 0 or 1 indicates that the UE should not transmit the SRS.

Aspect 8: The method of Aspect 6, wherein the pseudo-random sequence further indicates whether to transmit the SRS based at least in part on a comparison of a result of the modulo operation between the pseudo-random number and the integer to a threshold value.

Aspect 9: The method of Aspect 8, wherein the threshold value is less than the integer.

Aspect 10: The method of Aspect 9, wherein the result of the modulo operation between the pseudo-random number and the integer being greater than the threshold value indicates that the UE should transmit the SRS, and wherein the result of the modulo operation between the pseudo-random number and the integer being equal to or less than the threshold value indicates that the UE should not transmit the SRS.

Aspect 11: The method of any of Aspects 1-10, wherein the pseudo-random sequence indicates whether to transmit the SRS as a function of at least one of a comb offset index associated with the at least one SRS resource, a cyclic shift index associated with the at least one SRS resource, or an SRS sequence index associated with the at least one SRS resource.

Aspect 12: The method of any of Aspects 1-11, wherein each SRS resource of the at least one SRS resource includes multiple SRS symbols, and wherein the pseudo-random sequence indicates whether to transmit the SRS in each SRS symbol, of the multiple SRS symbols.

Aspect 13: The method of any of Aspects 1-11, wherein each SRS resource of the at least one SRS resource is associated with a slot, and wherein the pseudo-random sequence indicates whether to transmit the SRS in each slot.

Aspect 14: The method of any of Aspects 1-13, wherein each SRS resource of the at least one SRS resource includes multiple frequency hops, and wherein the pseudo-random sequence indicates whether to transmit the SRS in each frequency hop, of the multiple frequency hops.

Aspect 15: The method of any of Aspects 1-14, wherein the pseudo-random sequence is initialized at a beginning of each radio frame based at least in part on an SRS sequence identity configured for the at least one SRS resource.

Aspect 16: The method of any of Aspects 1-14, further comprising receiving, from the network entity, a configuration of a pseudo-random sequence initialization parameter, wherein the pseudo-random sequence is initialized at a beginning of each radio frame based at least in part on the pseudo-random sequence initialization parameter.

Aspect 17: A method of wireless communication performed by a network entity, comprising: transmitting, to a UE, a configuration of at least one SRS resource, wherein the configuration indicates a pseudo-random sequence for muting an SRS associated with the at least one SRS resource; and receiving, from the UE, the SRS via the at least one SRS resource based at least in part on the pseudo-random sequence.

Aspect 18: The method of Aspect 17, wherein the configuration of the at least one SRS resource is transmitted via an RRC message.

Aspect 19: The method of any of Aspects 17-18, wherein the configuration of the at least one SRS resource is associated with a single SRS resource.

Aspect 20: The method of any of Aspects 17-18, wherein the configuration of the at least one SRS resource is associated with an SRS resource set including multiple SRS resources.

Aspect 21: The method of any of Aspects 17-20, wherein the pseudo-random sequence indicates whether to transmit the SRS as a function of time.

Aspect 22: The method of Aspect 21, wherein the pseudo-random sequence indicates whether to transmit the SRS as a function of time based at least in part on a performance of a modulo operation between a pseudo-random number associated with the pseudo-random sequence and an integer.

Aspect 23: The method of Aspect 22, wherein the integer is 2, wherein a result of the modulo operation between the pseudo-random number and the integer being equal to one of 0 or 1 indicates that the UE should transmit the SRS, and wherein the result of the modulo operation between the pseudo-random number and the integer being equal to the other one of 0 or 1 indicates that the UE should not transmit the SRS.

Aspect 24: The method of any of Aspects 22, wherein the pseudo-random sequence further indicates whether to transmit the SRS based at least in part on a comparison of a result of the modulo operation between the pseudo-random number and the integer to a threshold value.

Aspect 25: The method of Aspect 24, wherein the threshold value is less than the integer.

Aspect 26: The method of Aspect 25, wherein the result of the modulo operation between the pseudo-random number and the integer being greater than the threshold value indicates that the UE should transmit the SRS, and wherein the result of the modulo operation between the pseudo-random number and the integer being equal to or less than the threshold value indicates that the UE should not transmit the SRS.

Aspect 27: The method of any of Aspects 17-26, wherein the pseudo-random sequence indicates whether to transmit the SRS as a function of at least one of a comb offset index associated with the at least one SRS resource, a cyclic shift index associated with the at least one SRS resource, or an SRS sequence index associated with the at least one SRS resource.

Aspect 28: The method of any of Aspects 17-27, wherein each SRS resource of the at least one SRS resource includes multiple SRS symbols, and wherein the pseudo-random sequence indicates whether to transmit the SRS in each SRS symbol, of the multiple SRS symbols.

Aspect 29: The method of any of Aspects 17-27, wherein each SRS resource of the at least one SRS resource is associated with a slot, and wherein the pseudo-random sequence indicates whether to transmit the SRS in each slot.

Aspect 30: The method of any of Aspects 17-29, wherein each SRS resource of the at least one SRS resource includes multiple frequency hops, and wherein the pseudo-random sequence indicates whether to transmit the SRS in each frequency hop, of the multiple frequency hops.

Aspect 31: The method of any of Aspects 17-30, wherein the pseudo-random sequence is initialized at a beginning of each radio frame based at least in part on an SRS sequence identity configured for the at least one SRS resource.

Aspect 32: The method of any of Aspects 17-30, further comprising transmitting, to the UE, a configuration of a pseudo-random sequence initialization parameter, wherein the pseudo-random sequence is initialized at a beginning of each radio frame based at least in part on the pseudo-random sequence initialization parameter.

Aspect 33: An apparatus for wireless communication at a device, comprising a processor; memory coupled with the processor; and instructions stored in the memory and executable by the processor to cause the apparatus to perform the method of one or more of Aspects 1-16.

Aspect 34: A device for wireless communication, comprising a memory and one or more processors coupled to the memory, the one or more processors configured to perform the method of one or more of Aspects 1-16.

Aspect 35: An apparatus for wireless communication, comprising at least one means for performing the method of one or more of Aspects 1-16.

Aspect 36: A non-transitory computer-readable medium storing code for wireless communication, the code comprising instructions executable by a processor to perform the method of one or more of Aspects 1-16.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: An apparatus for wireless communication at a device, comprising a processor; memory coupled with the processor; and instructions stored in the memory and executable by the processor to cause the apparatus to perform the method of one or more of Aspects 17-32.

Aspect 39: A device for wireless communication, comprising a memory and one or more processors coupled to the memory, the one or more processors configured to perform the method of one or more of Aspects 17-32.

Aspect 40: An apparatus for wireless communication, comprising at least one means for performing the method of one or more of Aspects 17-32.

Aspect 41: A non-transitory computer-readable medium storing code for wireless communication, the code comprising instructions executable by a processor to perform the method of one or more of Aspects 17-32.

Aspect 42: A non-transitory computer-readable medium storing a set of instructions for wireless communication, the set of instructions comprising one or more instructions that, when executed by one or more processors of a device, cause the device to perform the method of one or more of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, the one or more processors individually or collectively configured to:
   receive, from a network entity, a configuration of at least one sounding reference signal (SRS) resource, wherein the configuration indicates a pseudo-random sequence for muting an SRS associated with the at least one SRS resource and an initialization parameter for initializing the pseudo-random sequence for muting the SRS,
   wherein the initialization parameter is different than an SRS sequence identity associated with the SRS; and
   transmit the SRS using the at least one SRS resource based at least in part on the pseudo-random sequence for muting the SRS.

2. The apparatus of claim 1, wherein the configuration of the at least one SRS resource is received via a radio resource control (RRC) message.

3. The apparatus of claim 1, wherein the configuration of the at least one SRS resource is associated with a single SRS resource.

4. The apparatus of claim 1, wherein the configuration of the at least one SRS resource is associated with an SRS resource set including multiple SRS resources.

5. The apparatus of claim 1, wherein the pseudo-random sequence for muting the SRS indicates whether to transmit the SRS as a function of time.

6. The apparatus of claim 5, wherein the pseudo-random sequence for muting the SRS indicates whether to transmit the SRS as a function of time based at least in part on performing a modulo operation between a pseudo-random number associated with the pseudo-random sequence for muting the SRS and an integer.

7. The apparatus of claim 6, wherein the integer is 2, wherein a result of the modulo operation between the pseudo-random number and the integer being equal to one of 0 or 1 indicates that the UE should transmit the SRS, and wherein the result of the modulo operation between the pseudo-random number and the integer being equal to the other one of 0 or 1 indicates that the UE should not transmit the SRS.

8. The apparatus of claim 6, wherein the pseudo-random sequence for muting the SRS further indicates whether to transmit the SRS based at least in part on a comparison of a result of the modulo operation between the pseudo-random number and the integer to a threshold value.

9. The apparatus of claim 8, wherein the threshold value is less than the integer.

10. The apparatus of claim 9, wherein the result of the modulo operation between the pseudo-random number and the integer being greater than the threshold value indicates that the UE should transmit the SRS, and wherein the result of the modulo operation between the pseudo-random number and the integer being equal to or less than the threshold value indicates that the UE should not transmit the SRS.

11. The apparatus of claim 1, wherein the pseudo-random sequence for muting the SRS indicates whether to transmit the SRS as a function of at least one of a comb offset index associated with the at least one SRS resource, a cyclic shift index associated with the at least one SRS resource, or an SRS sequence index associated with the at least one SRS resource.

12. The apparatus of claim 1, wherein each SRS resource of the at least one SRS resource includes multiple SRS symbols, and wherein the pseudo-random sequence for muting the SRS indicates whether to transmit the SRS in each SRS symbol, of the multiple SRS symbols.

13. The apparatus of claim 1, wherein each SRS resource of the at least one SRS resource is associated with a slot, and wherein the pseudo-random sequence for muting the SRS indicates whether to transmit the SRS in each slot.

14. The apparatus of claim 1, wherein each SRS resource of the at least one SRS resource includes multiple frequency hops, and wherein the pseudo-random sequence for muting the SRS indicates whether to transmit the SRS in each frequency hop, of the multiple frequency hops.

15. The apparatus of claim 1, wherein the pseudo-random sequence for muting the SRS is initialized at a beginning of each radio frame based at least in part on an SRS sequence identity configured for the at least one SRS resource.

16. The apparatus of claim 1, wherein the pseudo-random sequence for muting the SRS is initialized at a beginning of each radio frame based at least in part on the initialization parameter.

17. An apparatus for wireless communication at a network entity, comprising:
   one or more memories; and
   one or more processors, coupled to the one or more memories, the one or more processors individually or collectively configured to:
   transmit, to a user equipment (UE), a configuration of at least one sounding reference signal (SRS) resource,
   wherein the configuration indicates a pseudo-random sequence for muting an SRS associated with the at least one SRS resource and an initialization parameter for initializing the pseudo-random sequence for muting the SRS, wherein the initialization parameter is different than an SRS sequence identity associated with the SRS; and receive, from the UE, the SRS via the at least one SRS resource based at least in part on the pseudo-random sequence for muting the SRS.

18. The apparatus of claim 17, wherein the configuration of the at least one SRS resource is associated with a single SRS resource.

19. The apparatus of claim 17, wherein the configuration of the at least one SRS resource is associated with an SRS resource set including multiple SRS resources.

20. The apparatus of claim 17, wherein the pseudo-random sequence for muting the SRS indicates whether to transmit the SRS as a function of time.

21. The apparatus of claim 20, wherein the pseudo-random sequence for muting the SRS indicates whether to transmit the SRS as a function of time based at least in part on a performance of a modulo operation between a pseudo-random number associated with the pseudo-random sequence and an integer.

22. The apparatus of claim 21, wherein the pseudo-random sequence for muting the SRS further indicates whether to transmit the SRS based at least in part on a comparison of a result of the modulo operation between the pseudo-random number and the integer to a threshold value.

23. The apparatus of claim 22, wherein the threshold value is less than the integer.

24. The apparatus of claim 23, wherein the result of the modulo operation between the pseudo-random number and the integer being greater than the threshold value indicates that the UE should transmit the SRS, and wherein the result of the modulo operation between the pseudo-random number and the integer being equal to or less than the threshold value indicates that the UE should not transmit the SRS.

25. The apparatus of claim 17, wherein the pseudo-random sequence is initialized at a beginning of each radio frame based at least in part on the initialization parameter.

26. A method of wireless communication performed by a user equipment (UE), comprising:

receiving, from a network entity, a configuration of at least one sounding reference signal (SRS) resource, wherein the configuration indicates a pseudo-random sequence for muting an SRS associated with the at least one SRS resource and an initialization parameter for initializing the pseudo-random sequence for muting the SRS, wherein the initialization parameter is different than an SRS sequence identity associated with the SRS; and transmitting the SRS using the at least one SRS resource based at least in part on the pseudo-random sequence for muting the SRS.

27. The method of claim 26, wherein the pseudo-random sequence for muting the SRS indicates whether to transmit the SRS as a function of time.

28. The method of claim 27, wherein the pseudo-random sequence for muting the SRS indicates whether to transmit the SRS as a function of time based at least in part on performing a modulo operation between a pseudo-random number associated with the pseudo-random sequence and an integer.

29. A method of wireless communication performed by a network entity, comprising:

transmitting, to a user equipment (UE), a configuration of at least one sounding reference signal (SRS) resource, wherein the configuration indicates a pseudo-random sequence for muting an SRS associated with the at least one SRS resource and an initialization parameter for initializing the pseudo-random sequence for muting the SRS, wherein the initialization parameter is different than an SRS sequence identity associated with the SRS; and receiving, from the UE, the SRS via the at least one SRS resource based at least in part on the pseudo-random sequence for muting the SRS.

30. The method of claim 29, wherein the pseudo-random sequence for muting the SRS indicates whether to transmit the SRS as a function of time based at least in part on a performance of a modulo operation between a pseudo-random number associated with the pseudo-random sequence and an integer.

* * * * *